(12) United States Patent
Brett et al.

(10) Patent No.: US 9,594,899 B2
(45) Date of Patent: Mar. 14, 2017

(54) APPARATUS AND METHOD FOR MANAGING OPERATION OF A MOBILE DEVICE

(75) Inventors: Bevin R. Brett, Brookline, NH (US); Paul M. Petersen, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 631 days.

(21) Appl. No.: 14/006,572

(22) PCT Filed: Dec. 30, 2011

(86) PCT No.: PCT/US2011/068073
§ 371 (c)(1),
(2), (4) Date: Sep. 20, 2013

(87) PCT Pub. No.: WO2013/101176
PCT Pub. Date: Jul. 4, 2013

(65) Prior Publication Data
US 2014/0013428 A1   Jan. 9, 2014

(51) Int. Cl.
*G06F 21/00* (2013.01)
*G06F 21/50* (2013.01)
*G06F 1/26* (2006.01)

(52) U.S. Cl.
CPC .............. *G06F 21/50* (2013.01); *G06F 1/26* (2013.01); *G06F 2221/2101* (2013.01)

(58) Field of Classification Search
CPC ..... G06F 21/50; G06F 1/26; G06F 2221/2101
See application file for complete search history.

(56) References Cited

U.S. PATENT DOCUMENTS

| 6,212,410 | B1 | 4/2001 | Ishida | |
|---|---|---|---|---|
| 7,591,018 | B1* | 9/2009 | Lee | G06F 21/567 726/24 |
| 2003/0098670 | A1 | 5/2003 | Kobayashi | |
| 2005/0245245 | A1* | 11/2005 | Sorvari | G06F 1/3203 455/418 |
| 2005/0253554 | A1* | 11/2005 | DiFazio | H02J 7/00 320/114 |

(Continued)

FOREIGN PATENT DOCUMENTS

| CN | 101341491 A | 1/2009 |
|---|---|---|
| CN | 102097832 A | 6/2011 |

(Continued)

OTHER PUBLICATIONS

Radimus, "Using Tasker", Pocketables Forum, posted Apr. 25, 2011, pp. 1-6.*

(Continued)

*Primary Examiner* — Michael Pyzocha
(74) *Attorney, Agent, or Firm* — KED & Associates LLP (57) ABSTRACT

A power charger includes a first storage area to store control software, a charging circuit to send power through an interface, and a processor to generate at least one control signal based on the control software. The power to be sent through the interface is to charge a battery of a device coupled to the interface, and the at least one control signal includes information to cause a monitoring operation to be performed to determine a status of the device.

16 Claims, 5 Drawing Sheets

(56) References Cited

U.S. PATENT DOCUMENTS

| | | | | |
|---|---|---|---|---|
| 2006/0158154 | A1* | 7/2006 | Maurilus | H04M 1/72527 320/115 |
| 2007/0096685 | A1* | 5/2007 | Skogmar | H02J 7/00 320/107 |
| 2007/0149255 | A1* | 6/2007 | Luo | H02J 7/0004 455/573 |
| 2007/0198866 | A1 | 8/2007 | Martilik | |
| 2007/0261118 | A1* | 11/2007 | Lu | G06F 21/562 726/24 |
| 2008/0167088 | A1 | 7/2008 | Rabu et al. | |
| 2009/0170569 | A1* | 7/2009 | Anzai | H04M 1/72527 455/573 |
| 2009/0222923 | A1 | 9/2009 | Dixon | |
| 2010/0011443 | A1* | 1/2010 | Zhao | G06F 21/567 726/24 |
| 2010/0037321 | A1* | 2/2010 | Oz | G06F 21/57 726/24 |
| 2010/0323668 | A1 | 12/2010 | Matsui | |
| 2011/0018679 | A1* | 1/2011 | Davis | H02J 7/025 340/3.1 |
| 2011/0197280 | A1 | 8/2011 | Young et al. | |
| 2011/0300906 | A1* | 12/2011 | Colgan | H02J 7/0045 455/558 |
| 2012/0066427 | A1* | 3/2012 | Johnson | G06F 13/40 710/306 |
| 2012/0272320 | A1* | 10/2012 | Rados | G06F 21/564 726/24 |
| 2012/0324578 | A1* | 12/2012 | Seinfeld | G06F 1/3206 726/24 |
| 2013/0034230 | A1* | 2/2013 | Takahashi | H04W 12/02 380/270 |
| 2013/0117854 | A1* | 5/2013 | Britton | G06F 21/56 726/24 |

FOREIGN PATENT DOCUMENTS

| | | |
|---|---|---|
| EP | 2 634 889 A1 | 9/2013 |
| WO | 2013101176 A1 | 7/2013 |

OTHER PUBLICATIONS

Chinese Office Action for Application 201180075925.7 dated Jan. 25, 2016.

Extended European Search Report for Application 11878831.4 dated Jul. 10, 2015.

International Preliminary Report on Patentability and Written Opinion Received for PCT Patent Application No. PCT/US2011/068073, mailed on Jul. 10, 2014, 8 pages.

International Search Report dated Sep. 26, 2012 for corresponding Application No. PCT/US2011/068073.

\* cited by examiner

APPARATUS AND METHOD FOR MANAGING OPERATION OF A MOBILE DEVICE

This application is a U.S. National Stage Application under 35 U.S.C. §371 of PCT Application No. PCT/US2011/068073, filed Dec. 30, 2011.

FIELD

One or more embodiments described herein relate to managing operating system or other functionality of an electronic device.

BACKGROUND

Smart phones, notebook computers, media players and other portable devices that connect to a network are susceptible to becoming infected by viruses and other agents that adversely affect performance. When infection occurs, the devices must be returned to the manufacturer or handled by a technician for possible repair. If repair is possible, the actions taken to return the devices to an operable state many times result in deleting important data, applications, and/or other information stored in internal memory circuits. These drawbacks translate into inconvenience and excessive costs to the user.

DETAILED DESCRIPTION

Figure 1:
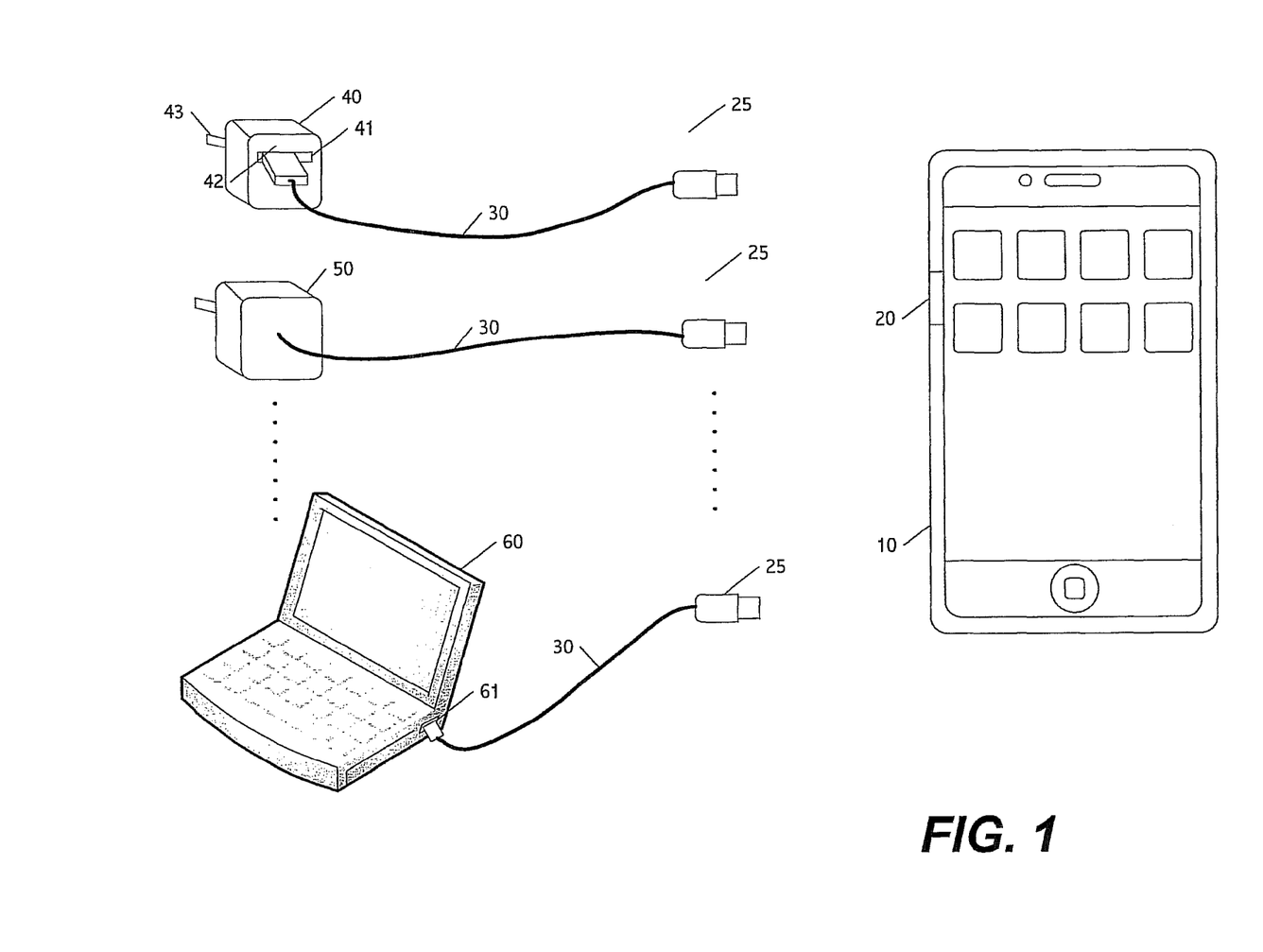
FIG. 1 shows an embodiment of an apparatus for controlling an electronic device.

FIG. 1 shows one embodiment of an apparatus for controlling an electronic device 10 having a battery that requires recharging. The device may be a smart phone, notebook or laptop computer, personal digital assistant, camera, tablet, pad- or pod-type device, media player, or other type of mobile information terminal which may or may not communicates with a network through a wired or wireless interface. The device may also be a flash drive or portable or external hard drive connected through an appropriate interface. The network may be the Internet and/or any other type capable of transferring data to and from the electronic device. For the sake of explanation, the electronic device is shown as a smart phone.

The smart phone includes a port 20 adapted to be coupled to a connector 25 mounted on a first end of an interface 30. The other end of the interface is coupled to a power charger that may take a variety of forms. One form is a power charger 40 equipped at one end with a Universal Serial Bus port 41 that is removably coupled to a plug 42 attached to the interface. At an opposing end, the power charger 40 may include an arrangement of prongs 43 that fit into a standard wall outlet or other standard power source, which may be generally referred to as the "mains."

Power charger 50 may be similar to charger 40, except that there is a permanent attachment between interface 30 and the charger.

Power charger 60 may be a notebook or other type of computer or processing device equipped with a USB interface port 61 adapted for coupling to interface 30. In FIG. 1, the interface may be a USB interface. However, in other embodiments, the interface may be another type including but not limited to FireWire, serial advanced technology attachment (SATA)-type interfaces, Thunderbolt, Ethernet, musical instrument digital interface (MIDI), universal host controller interface (UHCI), or any one of a number of other wired- or wireless-type interfaces.

Figure 2:
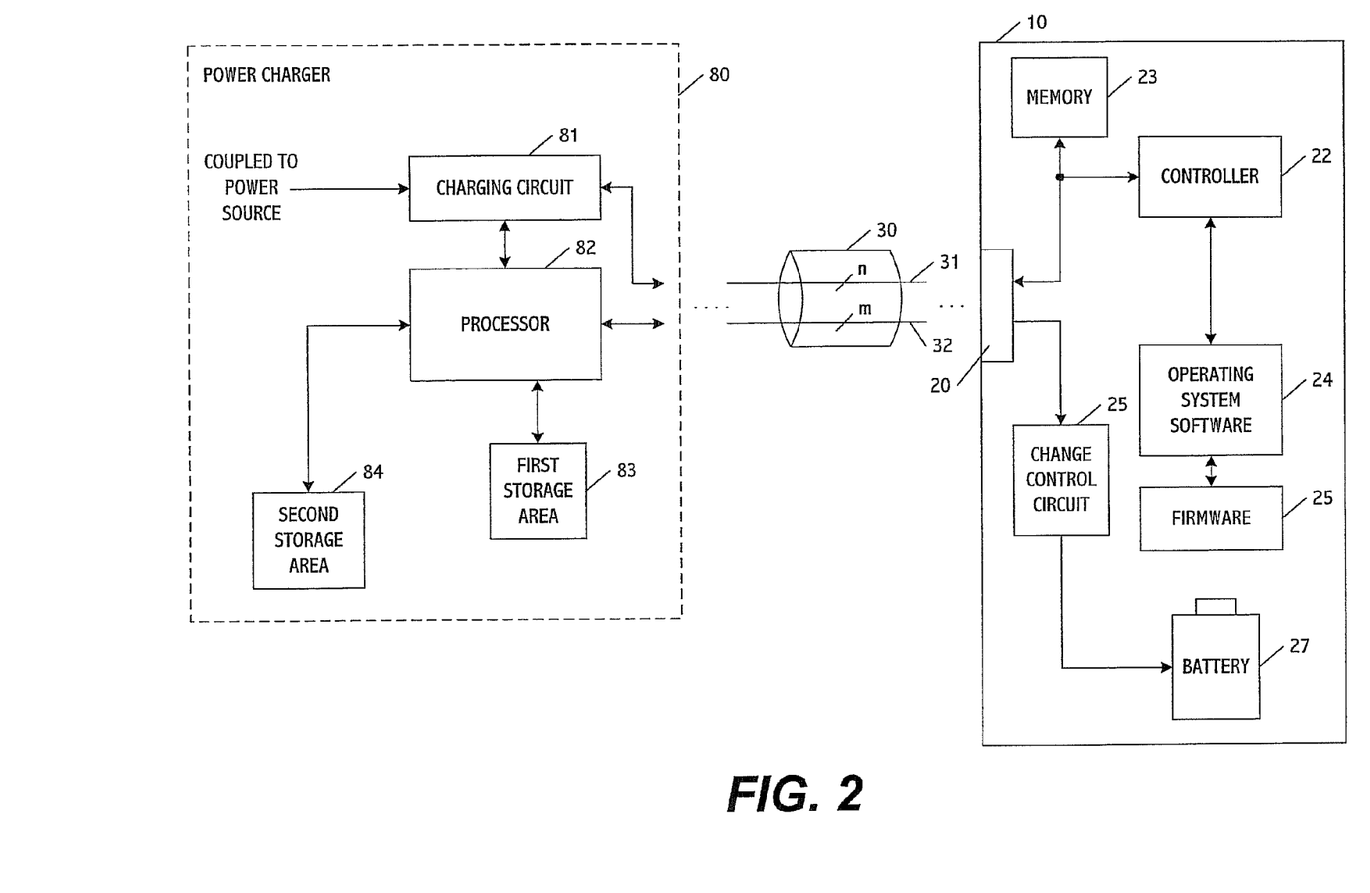
FIG. 2 shows an embodiment of the apparatus used to control a smart phone.

FIG. 2 shows one embodiment of a power charger 80 in block diagram form. This power charger may correspond to either of power chargers 40 or 50, and in accordance with one embodiment includes a charging circuit 81, a processor 82, a first storage area 83, and a second storage area 84 such as a memory to store control software (s/w) for controlling one or more operations to be performed by the controller.

The charging circuit 81 is coupled to a power source, which, for example, may be a wall outlet, car or other electrical adapter, or battery located within or coupled to the power charger. The charging circuit may include a detector to detect connection of phone 10, and upon such detection may send power to charge the phone battery through the interface 30. The amount of power delivered during charging may be controlled based on a predetermined management scheme, implemented by protection circuits and/or software to prevent overcharging and/or occurrences of other types of errors that may damage the connected phone.

The processor 82 executes management operations which may be guided, at least in part, by the control software in the first storage area. These operations include a monitoring operation to determine a status of the phone, one or more restoration operations to control the phone based on the status, and/or a back-up operation for data and other information stored in the phone. These operations will be discussed in greater detail relative to the method of FIG. 3.

The management operations may be performed, for example, at a time when the phone is connected to the charger, a predetermined time after the phone is connected to the charger, when a triggering signal is received from the phone, and/or when a predetermined event is detected. According to one embodiment, all or a portion of the management operations are performed during charging of the phone battery so as to be transparent to the user. As a result, phone management and charging may take place simultaneously, for example, while the user is asleep or otherwise occupied.

In other embodiments, all or a portion of the management operations may be performed after charging has been completed and the phone is still detected to be connected to the charger. Under these circumstances, display of a message on the phone screen indicating that charging has been completed may be delayed in order to allow the management operations to be performed.

Once performed, this message and/or other messages generated based on the outcome of the management operations may be displayed to notify the user and/or to solicit from the user one or more selections to be described in greater detail in the discussion which follows.

In other embodiments, all or portion of the management operations may be performed before charging has begun. Under these circumstances, the charging operation may be delayed pending the outcome of the monitoring operation or one or more of the other management operations. At this time, power from the charging source of the power charger may be used to operate the phone. This may provide beneficial, for example, if the phone has been so badly infected or otherwise compromised that charging is unnecessary because the phone needs to be immediately repair by a technician or replaced.

The second storage area 84 may serve as a repository for storing back-up data and/or other information received from the phone. This data and information may be received pursuant to the management operations performed by the processor and/or may be received based on instructions or other commands initiated by the processing architecture of the phone. The capacity of the storage area may vary, ranging from less than or equal to one Gigabyte to multiple gigabytes.

The interface 30 includes a plurality of signal lines for carrying out the charging and management functions for the phone. The signal lines may include one or more (n) power lines 31 to carry power from the power charger to the phone for charging the phone battery, and one or more (m) data and/or control lines 32 for carrying signals bi-directionally between the power charger and phone for performing the aforementioned management operations. In this regard, the power line(s) may be coupled to charging circuit 81 and the data and/or control line(s) coupled to the processor The phone may operate, for example, based on any one of a number of operating systems including but not limited to an Apple operating system, an Android operating system, a Windows-type operating system, a Symbian operating system, a Blackberry operating system, a Linux-based operating system, a Java-based operating system, a proprietary type of software, as well as others. While device 10 has been identified as a smart phone, in other embodiments device 10 may be another type of phone including one that is not necessary classified as a smart phone such as what are commonly now referred to as feature or legacy mobile phones. Additionally, device 10 may be another type of device that can become infected with malware such as electronic book readers, tablets, notebook computers, netbooks, and gaming devices.

In FIG. 2, phone 10 is illustratively shown to include a controller 22 for executing operating system software 24 and firmware 25, a memory 23 for storing data associated with use of the phone including contacts, text messaging, and/or applications, and a charging control circuit 26 for receiving power from the charger for controlling the charging of battery 27. In this arrangement, the charging circuit is coupled to line(s) 31 and the controller to line(s) 32 of the interface.

The operating system software controls the performance of functions that govern the generation operation of the phone, and the firmware may include security software (or so-called secure firmware) for performing various monitoring, maintenance, and repair operations for the phone. This firmware may include secure firmware for monitoring and checking system basic input/output system (BIOS), network connections, storage, and/or other aspects related to operation of the device. Firmware other than that specifically related to security may also be stored.

The firmware may be considered to be part of the operating system software or may be differently stored. According to one embodiment, interaction between the processor of the power charger and operations performed by the controller based on the device firmware may allow for or otherwise assist in the management operations of the power charger to be performed.

Figure 3:
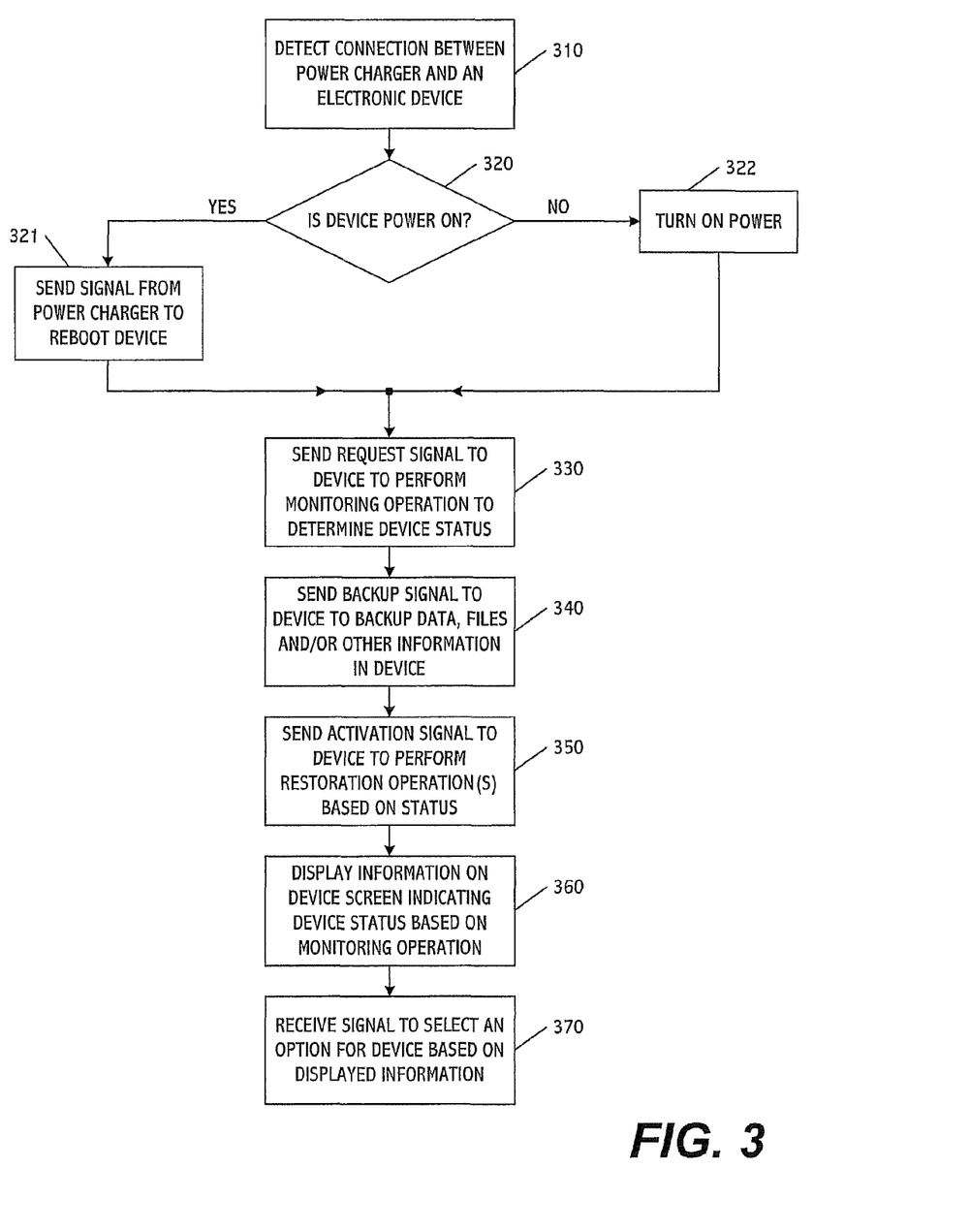
FIG. 3 shows an embodiment of a method for controlling an electronic device.

FIG. 3 shows operations included in one embodiment of a method for controlling an electronic device, which may be any of those previously mentioned. For illustrative purposes, it will be assumed that this device is a smart phone as shown in FIG. 2. The method may be performed by power charger 80 shown in this figure. However, in another embodiments, an apparatus different from this power charger may be used to perform one or more operations of this method. (An example of another type of apparatus is discussed relative to FIG. 4, where that other apparatus corresponds to a notebook computer).

The method includes detecting a connection between power charger 80 and an electronic device 10 through interface 30. (Block 310). At this time, the device may be powered on with less-than-full battery power or the device may be powered off. The connection is detected by processor 82 (and also the controller in the device) according to, for example, signals exchanged through and/or voltage or capacitance levels on one or more of the signal lines of the interface.

Once this connection is detected, a determination is made by processor 82 as to whether the power of the device is on or off. (Block 320). This determination may be made, for example, based on the level of signals on one or more lines of the interface or by other standard techniques.

In one embodiment, if the power of the device is on, processor 82 sends a signal to the device controller 22 to perform a reboot operation. (Block 321). Once received, the controller reboots the device based on, for example, internally stored basic input-output system (BIOS) software or other procedures to be performed under control of the device operating system.

If processor 82 determines that power of the device is off, then the operating system software or firmware of the device turns on power and initiates a boot function when connection to the power charger is detected. (Block 322).

After booting or rebooting, the processor in the power charger 82 performs a monitoring operation for the device based on one or more conditions programmed into the control software 84. (Block 330). The one or more conditions may include detection of the connection between the charger and device, expiration of a predetermined time period after detection of the connection (determined, for example, by a clock within the processor), a status of the charging operation to be performed for the device battery, receipt of a triggering signal initiated from the device (sent, for example, after detection of the connection to the charger or as otherwise programmed into the operating system software or firmware), and/or when some other predetermined event is detected.

According to one embodiment, the monitoring operation includes determining whether the device has been infected with one or more viruses that have corrupted the operating system or which have otherwise adversely affected operation, whether the device contains corrupted or infected files, and/or whether the device has otherwise been compromised. This damage may occur, for example, as a result of a virus from the internet, magnetic or electromagnetic interference, physical damage (e.g., dropping the device), an internal malfunction of the operating system, improper installation of updated software, or a manufacturing defect in the hardware or operating system of the device as well as any number of other influences that may corrupt device operation.

According to one particular example, the device may be determined to be infected (e.g., have one or more corrupted files) but the firmware is unaffected and in proper condition.

According to another example, the device may be determined to be infected as a result of firmware that is malfunctioning or is otherwise corrupt, but a check of the firmware indicates that the firmware is valid as a result of the malfunction or corrupting agent.

Figure 4:
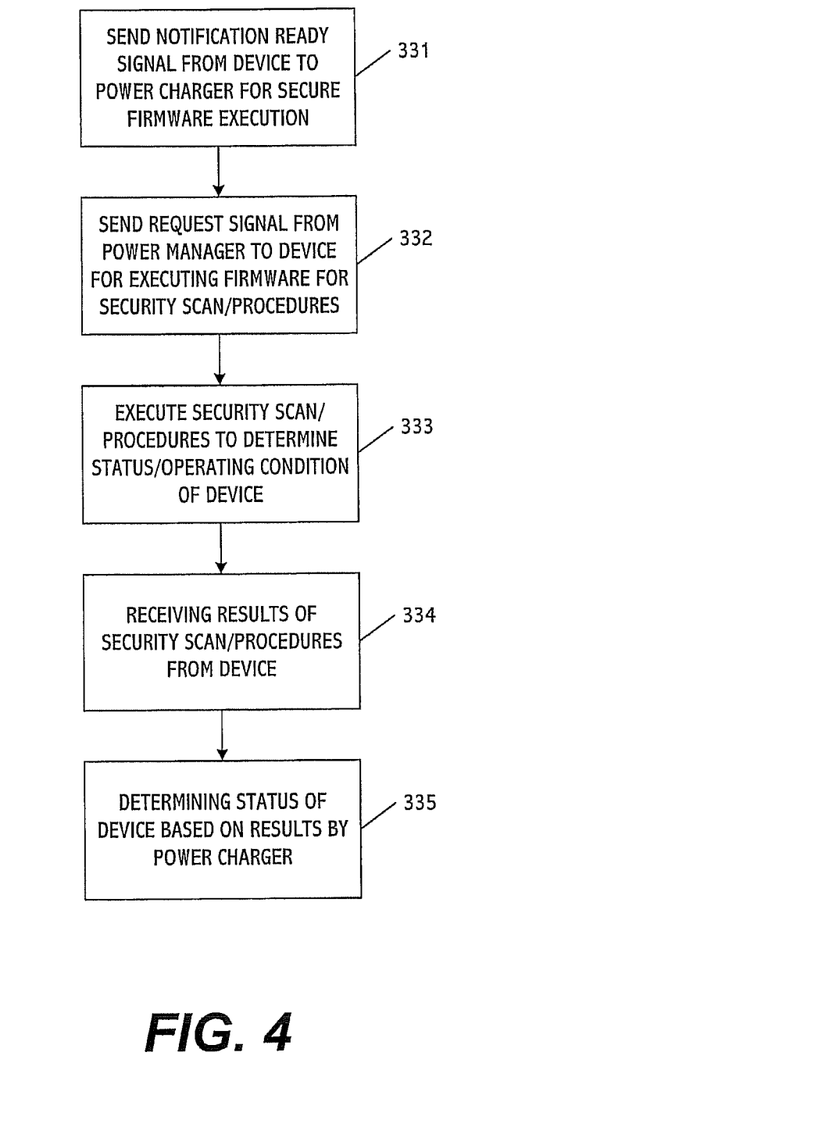
FIG. 4 shows operations corresponding to a monitoring operation.

Referring to FIG. 4, according to one embodiment, secure firmware 25 in the device causes controller 22 to send a notification signal to the processor of the power charger indicating that the firmware is ready to be executed. (Block 331). Upon receiving this signal, the power charger processor begins a monitoring function, considering, for example, under the assumption that the connected device is a new device.

The monitoring operation may include sending a signal from the processor of the power charger to the device controller, to request the device controller to perform a security scan or other procedure to determine the status of the device. (Block 332). Upon receipt of this signal or by some other determination, the controller of the device performs the scan/procedure (Block 333).

According to one embodiment, the security scan/procedure may include performing a checksum operation of files using the master boot record (MBR). The MBR may include a partition table that describes partitions of the storage unit(s) of the device which may include memory 23 and/or one or more other internal memories including any one of a number of read-only and/or random access memories. The files in each partition are scanned to determine their status and corrupted or infected files may be identified, if any. According to one embodiment, a database of signatures may be maintained using, for example, Microsoft's File Checksum Integrity Verifier (FCIV) tool. The signatures may be stored in the power charger, device, or both.

The secure firmware of the device may execute other types of security scans in addition to or in lieu of performing a checksum function. Examples include tests to determine bad sectors or regions in internal memory, tests to locate bugs in the operating system software, firmware or files, boundary scan testing, register scans, kernel analysis, and procedures for locating malware, trojans, cookies, viruses, spam, worms, root kits, and or test to locate other types of contaminating agents including ones used to corrupt data and other types of files.

Once the checksum operation and/or security scan/procedures have been completed, the results are sent by the controller to the processor of the power charger through the interface. (Block 334). This may be accomplished, for example, using an approach corresponding or similar to the trusted execution technology (TXT) function within Intel's Vpro architecture, if such an architecture is applicable within the device. If not, the results may be sent using another hardware and/or software based technique compatible with the operating environment of the device.

The processor of the power charger determines the status of the device based on the results. (Block 335). For example, if no problems were located by the secure firmware, then the device may be determined to have a good status, e.g., in proper operating condition. Otherwise, the status of the device may be determined to be in a vulnerable or corrupt condition based on which problems were located by the scan.

Returning to FIG. 3, if the status is less than good, the processor of the power charger may send a back-up signal to the controller of the device. The back-up signal may instruct the device controller to back-up data, files, and other information stored in the device. (Block 340). In response to the back-up signal, the controller of the device may send files, data, and/or other information (stored in memory 23 and/or in other internal locations) to the power charger for storage in storage area 83. The specific data, files, and information to be backed up may be determined, for example, based on information contained within the back-up signal, the firmware or operating system software in the device, or a combination of both. (The performance of this back-up operation at this time. As will be explained, the backup operation may be performed after an attempt at restoring the device, as will now be described.)

After the status of the device has been determined, the processor of the power charger may send an activation signal to the controller of the device. The activation signal may instruct the device controller to perform one or more restoration operations. (Block 350). These operations pre-programmed into the device firmware or software, or the power charger processor may retrieve software for execution the restoration operations from memory 84 for transmission to the device through the interface.

The restoration operations to be performed are ones based on the specific types of problems discovered by the scan/procedures performed by the device secure firmware. For example, the restoration operations may include file recovery functions that include recovery of deleted files or files located in bad sectors or regions in memory, restoration of corrupted files, and deletion of corrupted files. Any one of a number of file recovery tools and software may be used to perform the restoration. A restoration operation may also be performed which restores the device to a previous setting or acceptable state, e.g., similar to the manner in which a system restore is performed for a computer or other device.

After restoration is attempted, an optional back-up operation initiated, based on a signal sent from the power charger processor and/or or internal firmware of the device) may be performed to back-up the data, files, and or other information into the storage area of the charger. The contents of the second storage area 84 may be accessed at a later time, should the restoration operation fail to restore the device to a good status or if the restoration operations fail because the device is determined to otherwise be wholly or partially inoperative.

After the restoration operations are performed, the device controller may cause information to be displayed on a screen of the device. The information may provide, for example, an indication of the results of the monitoring operation performed in the device. (Block 360). These results may include, for example, results of the security scan/procedures performed by the secure firmware. According to one embodiment, one of the following messages may be displayed on the device screen:

Status
No Issues Found
Plausible Changes Found
Possibly Compromised

In response to display of the second or third messages, the user may select one of a plurality of options from a displayed control menu in response to the displayed status. (Block 370). have one of the following actions performed:

Power Off
Power On (default if the user merely unplugs the device from the interface)
Call Phone Number for Automatic Software Update
Transmit Backup Data in Power Charger to Website Storage
Transmits Notification Message to Network
Call the Call Center for Repair According to one embodiment, all or a portion of the foregoing monitoring, restoration, or back-up operations are performed during charging of the phone battery. As a result, phone management and charging may take place simultaneously, for example, while the user is asleep or otherwise occupied.

Alternatively, all or a portion of these operations may be performed before battery charging begins or after battering charging has been completed. If before battery charging begins, the controller of the device may be powered by the charger without charging the device battery.

The method may also include a number of additional or optional operations. For example, monitoring operation to perform a secure scan to determine the status of the phone may be performed before a formal booting operation is performed. This may be accomplished by powering the controller to perform the scan without enabling the system BIOS. Then, based on the status of the device determined by the scan, the booting operation may be performed, at least for portions or sub-systems of the device that have determined to be uninfected or which otherwise have a good operating status.

Examples of these portions or sub-systems include the core kernel, device drivers, system services (e.g., daemons), and applications. If the core kernel is verified, it can selectively booted. This, however, may prevent other portions of the operating system or other software from being loaded, launched, and/or accessed under certain conditions. For example, verifying the core kernel may allow the device to boot, but an application such as the device camera driver may not be functional until the driver software (or relevant portion of the operating system software) can be restored or otherwise repaired.

This selective booting may be performed based on a control signal from the processor of the power charger, or may be automatically performed based on the operating system software or firmware of the device.

In addition to the monitoring and restoration operations previously discussed, the operating system of the device may have a hook in its file system that may be used as a basis for identifying and/or intercepting requests to open a file. This may be used to build a list of files to be used as the entire device is started. The filenames and signatures of the file attributes and data may then be sent to the processor of the power charger.

Also, requests to open a file may be stalled until signatures are verified by the power charger, but then may be continued as soon as possible so that alarm clocks and other features are not disabled for more than a small period of time, e.g., a few seconds.

Also, after the monitoring operations are performed but before restoration occurs, the processor of the power manager and/or the operating system software/firmware of the device may cause a message to be displayed giving the user the option of how restoration is performed. This message may be displayed, for example, during charging or before or after charging is performed. The message may include a list of the options listed below. Restoration operations are then performed based on the selection made by the user, with or with a preceding and/or succeeding back-up operation.

Figure 5:
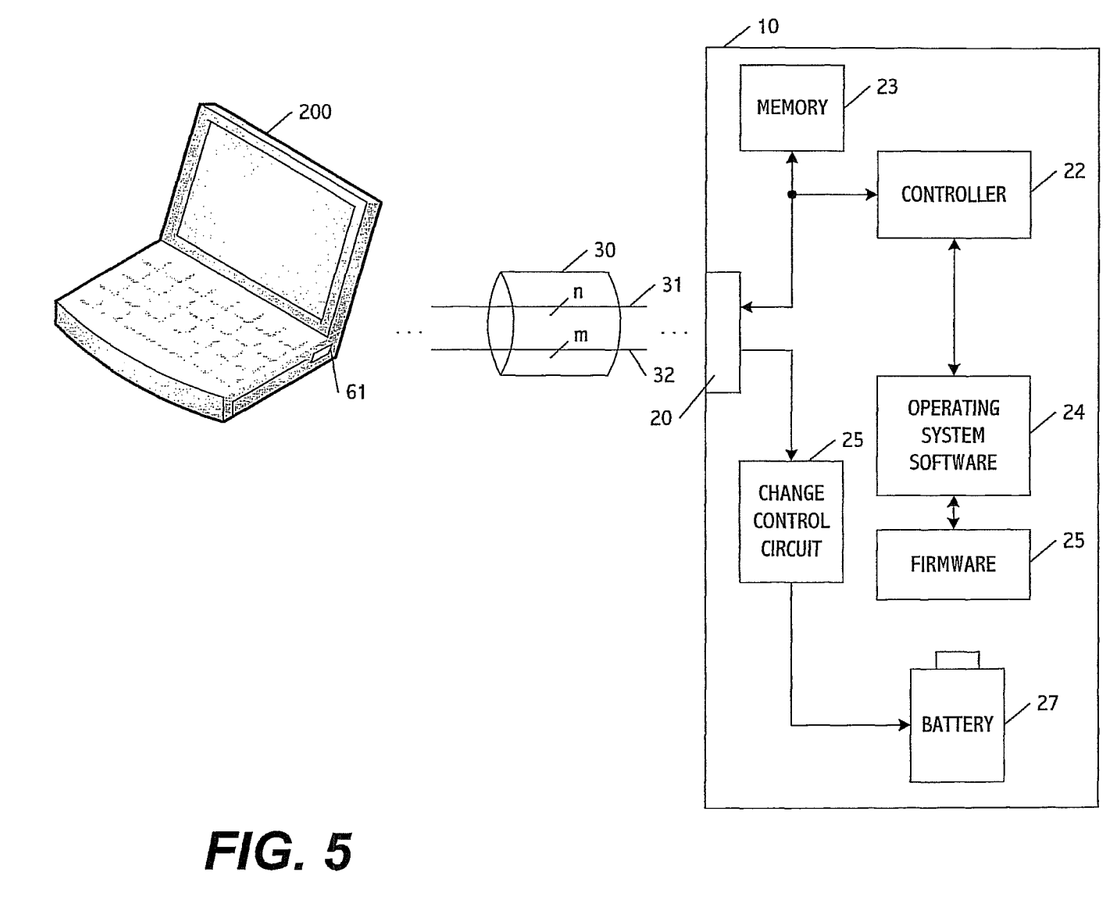
FIG. 5 shows another embodiment of an apparatus for controlling an electronic device.

Restoration Options
Restore to a Restore Point
1) Most Recent
2) Pick from List
Restore to Factory Default Settings FIG. 5 shows another embodiment of an apparatus for controlling an electronic device. In this embodiment, the interface and electronic device may be any of the types and configured in a manner similar to those in the foregoing embodiments. The power manager 200, however, is a computer, which may be a desktop or portable computer such as a notebook computer, tablet, or other computing device.

The computer includes a port 61 for coupling to interface 30. Control software stored in the computer performs operations similar to those of the processor in the power manager of FIG. 2, as well as additional operations. For example, a back-up operation may be performed which involves transmitting the data, files, and other information received from the device to a network storage location including but not limited to a server of the wireless service provider of the device and/or to a cloud-type or other remotely located storage area. The back-up data may then be accessed at a later time to allow the device to recover the data, if the device was infected or compromised.

In accordance with another embodiment, a non-transitory computer-readable medium stores a program for controlling a device such as any of those previously described. The storage medium may be an internal read-only or random-access memory or another type of memory, and the program includes code to perform the operation of the method described herein.

In addition to the power chargers shown in FIG. 1, in accordance with another embodiment the power charger may include an internal battery of its own to be used in charging the batter of the device. Such an embodiment would be useful, for example, for purposes of assisting travelers or those who are not in their own office or home.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Also, the features of any one embodiment described herein may be combined with the features of one or more other embodiments to form additional embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although the present invention has been described herein with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:

1. A power charger comprising:
a first storage area to store control software;
a charging circuit to send power through an interface;
a processor to generate at least one control signal based on the control software,
wherein the power to be sent through the interface is to charge a battery of a device to be coupled to the interface and wherein the at least one control signal includes information to cause a monitoring operation to be performed to determine a status of the device based on a security scan, wherein in response to the determined status of the device, the processor to provide a back-up signal to the device to request back-up data to be provided from the device to the power charger; and
a second storage area to store the back-up data to be received from the device through the interface, the back-up data to be received simultaneously as the device is being charged by the power charger, wherein after the status of the device is determined, the processor is to provide another control signal to the device to cause a restoration operation to be simultaneously performed at the device while the device is to be charged by the power charger, the another control signal is to be sent to the device after the monitoring operation is to be performed and while the device is to be charged by the power charger.

2. The power charger of claim 1, wherein the monitoring operation is to include performance of the security scan of one or more files stored in the device.

3. The power charger of claim 1, wherein the processor is to receive information from the device through the interface and wherein the received information is to provide an indication of the status of the device based on the monitoring operation.

4. The power charger of claim 1, wherein the status determined by the monitoring operation corresponds to presence of an error in the device.

5. The power charger of claim 4, wherein the error corresponds to contamination of at least one of a file, data, or software in the device.

6. The power charger of claim 5, wherein the contamination is from at least one of a bad sector of a storage medium, a virus, or another contaminating agent.

7. The power charger of claim 1, wherein the at least one control signal is to be sent to the device through the interface as power is simultaneously sent to the device through the interface for charging the battery.

8. The power charger of claim 1, wherein the interface is a Universal Serial Bus (USB) interface.

9. The power charger of claim 1, further comprising:
a port to removably receive a connector coupled to the interface.

10. A portable computer comprising:
a display of the portable computer;
a first storage area to store control software;
a charging circuit to send power through an interface;
a processor to generate at least one control signal based on the control software,
wherein the power to be sent through the interface is to charge a battery of a device to be coupled to the interface and wherein the at least one control signal includes information to cause a monitoring operation to be performed to determine a status of the device based on a security scan, wherein in response to the determined status of the device, the processor to provide a back-up signal to the device to request back-up data to be provided from the device to the portable computer; and
a second storage area to store back-up data to be received from the device through the interface, the back-up data to be received simultaneously as the device is being charged by the charging circuit, wherein the processor is to provide another control signal to the device to cause a restoration operation to be simultaneously performed in the device while the device is to be charged by the portable computer, the another control signal is to be sent to the device after the monitoring operation is to be performed and while the device is to be charged by the portable computer.

11. The portable computer of claim 10, wherein the monitoring operation is to include performance of the security scan of one or more files stored in the device.

12. The portable computer of claim 10, wherein:
the processor is to receive information from the device through the interface,
the information is to provide an indication of the status of the device based on the monitoring operation, and
the status corresponds to presence of an error in the device.

13. The power charger of claim 1, wherein the monitoring operation to be performed at a predetermined time after the device is connected to the power charger.

14. The power charger of claim 1, wherein the monitoring operation is to be performed when a triggering signal is received from the device.

15. The power charger of claim 1, wherein the monitoring operation is to be performed when a predetermined event is detected.

16. The power charger of claim 1, wherein the processor to determine if power of the device is on, and the processor to send a signal to the device to perform a reboot operation when the processor determines that power of the device is on.

* * * * *